United States Patent [19]

Kim

[11] Patent Number: 5,475,444
[45] Date of Patent: Dec. 12, 1995

[54] CHANNEL EQUALIZER FOR A HDTV USING A COMPOSITE FILTER

[75] Inventor: Myung S. Kim, Seoul, Rep. of Korea

[73] Assignee: Goldstar Co., Ltd., Seoul, Rep. of Korea

[21] Appl. No.: 345,823

[22] Filed: Nov. 21, 1994

[30] Foreign Application Priority Data

Apr. 12, 1994 [KR] Rep. of Korea .................... 7621/1994

[51] Int. Cl.$^6$ .................................................. H04N 5/213
[52] U.S. Cl. .......................... 348/608; 348/614; 348/914; 348/611
[58] Field of Search ...................... 348/611, 614, 348/914, 710, 608, 726, 638, 639, 641, 466; 358/36, 167, 905; 375/229, 235, 266, 230, 231; H04N 5/21, 5/213, 5/217

[56] References Cited

U.S. PATENT DOCUMENTS

| | | | |
|---|---|---|---|
| 4,091,418 | 5/1978 | Ciciora | 348/614 |
| 5,315,617 | 5/1994 | Guida | 348/441 |

Primary Examiner—James J. Groody
Assistant Examiner—Sherrie Hsia
Attorney, Agent, or Firm—Finnegan, Henderson, Farabow, Garrett & Dunner

[57] ABSTRACT

A channel equalization system of a VSB transmission system for a HDTV which can correct phase errors by using composite filters as well as by using general data even in a period having no training sequence. The channel equalizer for a HDTV includes, a composite filter part for making the input signal applied from outside produced as a I signal and a Q signal, filtering the I signal and the Q signal according to composite filter coefficients, and transmitting the filtered I and Q signals as first and second output signals. A composite filter restoring part for calculating an error for the training sequence and an error for the general data using a synchronization signal received from outside of the channel equalizer, the first and second output signals, and calculating real composite filter coefficients and imaginary composite filter coefficients based on the errors for the I signal and the Q signal produced at the composite filter part and training sequence and the error for general data and transmitting the calculated errors to the composite filter part.

15 Claims, 6 Drawing Sheets

CHANNEL EQUALIZER FOR A HDTV USING A COMPOSITE FILTER

BACKGROUND OF THE INVENTION

1. Field of the Invention

This invention relates to a HDTV that carries out correction of error and channel equalization at the same time in a vestigial side band transmission system.

2. Discussion of the Related Art

The Grand-Alliance vestigial side band (VSB) digital transmission system has a transmitter for receiving data input, for converting the received data input into a transmission format, and for transmitting the converted data input through a transmission channel. A receiver is provided for converting the data received from the transmitter through a transmission channel into a reception format and transmitting the converted data.

The VSB system transmits data according to the data frame of a VSB transmission system as shown in FIG. 1.

A frame consists of segments which have 836 symbols each, and each of the segments includes four symbols of segment synchronization signal, 832 symbols of data and a FEC (Forward Error Correction) signal.

Each data frame has 313 segments, one of which is a data field synchronization segment containing training sequence and 312 segments are general data segments.

The training sequence signal is a signal contained in the field synchronization signal, transmitted from the transmitter to the receiver, for correcting errors caused when the data is transmitted through a transmission channel at the receiver. The training sequence signals in odd fields are identical and the training sequence signals in even fields are inverted signals of the training sequence signals in the odd fields.

The channel equalizer is a system element used in the receiver for compensation of linear channel distortion, such as tilt and ghost, caused by defective system elements that are in a transmission channel or a receiver.

Channel equalization is a process that uses a filter, opposite to the transmission characteristic of a channel, for reducing channel distortion caused during transmission, wherein the most important question is how to calculate the filter coefficient.

For example, when data of 'I' is transmitted from a VSB transmission system, in case the characteristic function of the transmission channel is 'f', the receiver receives a signal of 'I·f'.

The channel equalizer in the receiver is provided with an inverted function of $f^{-1}$, which is an inversion of the characteristic function of the transmission channel, for making the input signal become $I \cdot f \cdot f^{-1} = I$ once it has passed the channel equalizer, thereby restoring the input signal to be the original input signal.

Thus, the channel equalizer, obtaining an inverted function which is an inversion of the characteristic function of the transmission channel, restores a signal transmitted through a transmission channel to an original signal without any distortion.

The filter coefficient of the channel equalizer can be obtained with the LMS (Least Mean Square) algorithm. This LMS algorithm can be expressed in the following equation.

$$C_{k+1} = C_k + \Delta(I_{TK} - I_{Tk})I_{in} \quad \text{equation (1)},$$

wherein, $C_{k+1}$ is the filter coefficient of the channel equalizer, $C_k$ is a filter coefficient obtained previously, $I_{Tk1}$ is a training sequence signal already decided at the transmitter, $I_{Tk2}$ is a training sequence signal of a channel equalizer output, containing errors due to transmission through a transmission channel, and $I_{in}$ is the input signal of the channel equalizer.

As shown in FIG. 2, the conventional channel equalizer includes a finite impulse response filter (hereinafter called 'FIR filter') 1 for receiving input signal $I_{in}$ and filter coefficient $C_F$, a slicer for converting the input signal into a signal having a predetermined transmission level, a filter coefficient calculator 5 for receiving a synchronization signal SYNC, the training sequence signal applied from outside (i.e., applied from the receiver) $I_{Tk1}$, and the training sequence signal which was converted into a signal having a predetermined transmission level $I_{Tk2}$ through the slicer 3, and generating filter coefficients $C_F$ and $C_I$ based on the received signals. An infinite impulse response filter (hereinafter called 'IIR filter') 4 receives the filter coefficient $C_I$ transmitted from the filter coefficient calculator 5 and the converted training sequence signal $I_{Tk2}$. An adder 2 receives signals from the FIR filter 1 and the IIR filter 4, adds the two signals and transmits the added signal as an output signal $I_{out}$ of the equalizer.

As has been explained, the conventional equalizer has two filters of FIR filter 1 and IIR filter 4, wherein the FIR filter 1 carries out filtering of the input signal Iin utilizing the filter coefficient $C_F$ applied from the filter coefficient calculator 5, and the IIR filter 4 carries out filtering of the training sequence signal converted into a signal having a predetermined transmission level $I_{TK2}$ through the slicer 3 utilizing the filter coefficient $C_I$ applied from the filter coefficient calculator 5. The adder 2 adds the signals received from the FIR filter 1 and the IIR filter 4 and transmits the result of the addition as the output signal of the channel equalizer $I_{out}$.

The signal received from the adder 2 $I_{out}$ is not filtered by directly applying the received signal to the IIR filter 4, but is instead filtered by applying the received signal fed back after conversion into a signal having a predetermined transmission level through the slicer 3 to the IIR filter 4. The reason for not directly filtering is that the channel equalizer cannot converge but rather diverges the received signal, in case channel equalization is carried out, by applying the training sequence signal, which contains errors, to the channel equalizer.

The filter coefficient calculator 5 performs the filter coefficient calculation using the input signal $I_{in}$, the training sequence signal applied by the receiver $I_{Tk1}$, the converted training sequence signal having a predetermined transmission level $I_{Tk2}$, and the synchronization signal SYNC.

The training sequence signal $I_{Tk1}$ and the synchronization signal SYNC are signals applied from outside of the channel equalizer, and the synchronization signal SYNC indicates the position of the received training sequence signal $I_{Tk1}$.

Since the training signal $I_{Tk1}$ is a value already determined at the transmitter, it always has a specific value, whereas the converted training sequence signal having a predetermined transmission level $I_{Tk2}$ varies depending on the error value.

Therefore, the filter coefficient calculator 5 calculates error value ($I_{Tk1} - ITk_2$) based on the training sequence signal $I_{Tk1}$ received from the slicer 3 and the training sequence signal $I_{Tk1}$ applied from outside the transmitter during the training sequence period in which the synchronization signal SYNC is being applied.

Accordingly, the constant $\Delta$ is multiplied by the error value ($I_{Tk1} - I_{Tk2}$), and by the input signal $I_{in}$.

Upon addition of this multiplied value to the previous filter coefficient $C_k$, the filter coefficient shown in equation (1) can be obtained.

Then, the FIR filter 1 and the IIR 4 filter can carry out channel equalization using the filter coefficients $C_F$ and $C_I$ received from the filter coefficient calculator 5.

However, the conventional channel equalizer is only operable during a training sequence period, and because the channel equalizer has a significantly low converging speed, the error correction speed is slow, and cannot correct the phase errors contained in the transmission signals because the channel equalizer carries out channel equalization only using I signals, but not Q signals as the input signals.

SUMMARY OF THE INVENTION

The present invention has been made in view of the above circumstances and has as an object to provide a channel equalizer for a HDTV, which can improve the error correction speed by carrying out channel equalization using not only the training sequence but also general input data.

A further object of the present invention is to provide a channel equalizer for a HDTV, which can correct phase errors contained in the transmission error using a composite filter.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the channel equalizer for a HDTV of this invention comprises a composite filter part for receiving an input signal from outside of the channel equalizer and producing an I signal and a Q signal based on the received input signal, filtering the I signal and the Q signal according to composite filter coefficients, and transmitting the filtered I and Q signals as first and second output signals respectively. A composite filter restoring part is provided for calculating an error for a training sequence and errors for general data using a synchronization signal received from outside of the channel equalizer, the first output signal and the second output signal received from the composite filter part, and for calculating real composite filter coefficients and imaginary composite filter coefficients based on errors for the I signal and the Q signal produced at the composite filter part and the error of the training sequence and the errors for the general data and transmitting the calculated real and imaginary composite filter coefficients to the composite filter part.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

DETAILED DESCRIPTION OF THE INVENTION

Figure 1:
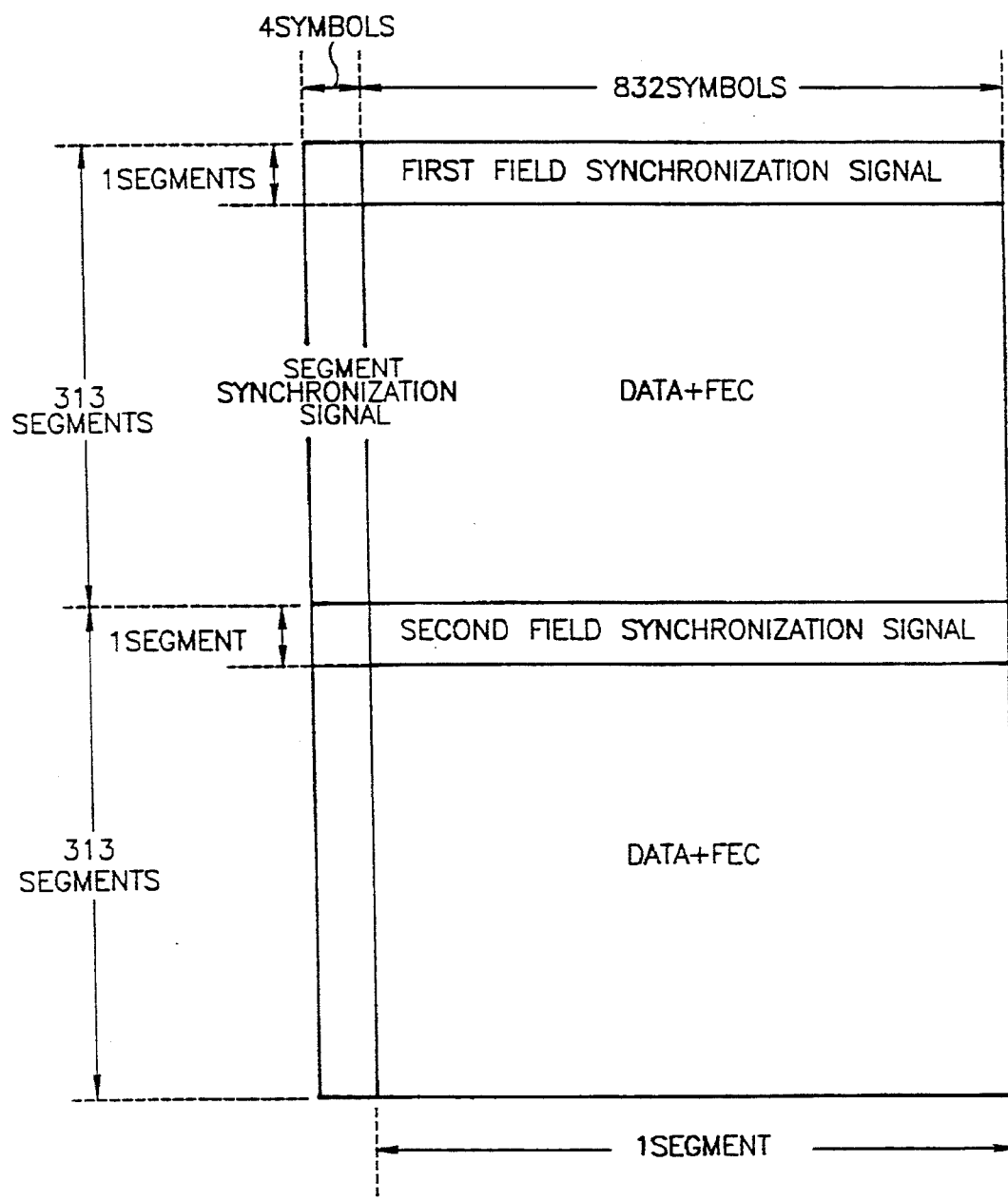
FIG. 1 is a diagram of a data frame of a VSB digital transmission system.
Figure 2:
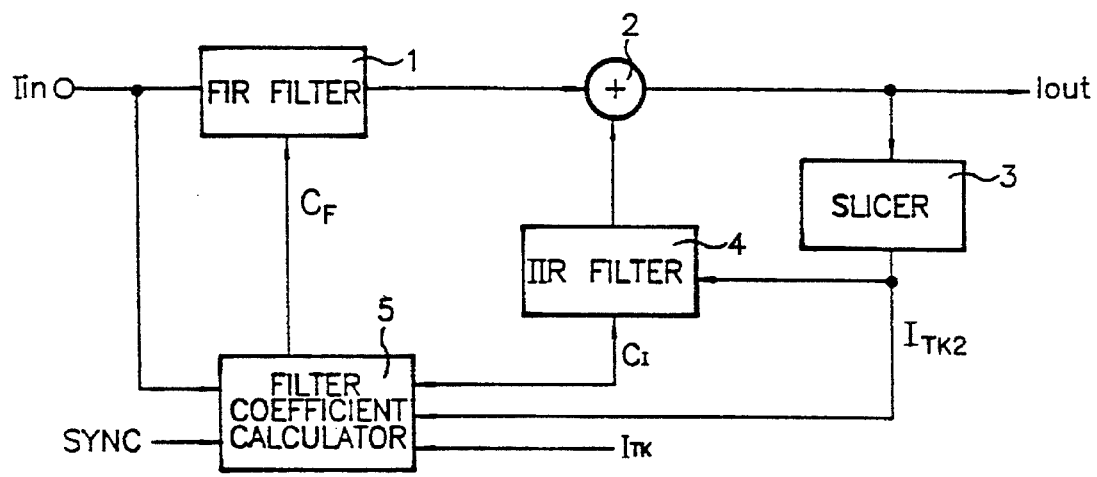
FIG. 2 is a block diagram of a channel equalizer of a conventional VSB digital transmission system.
Figure 3:
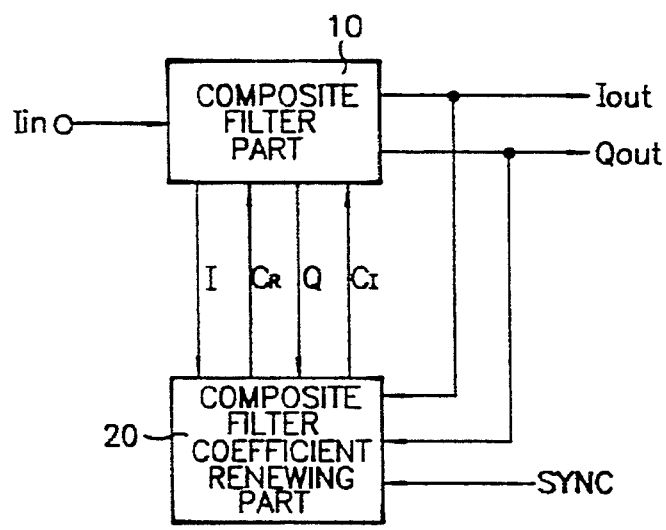
FIG. 3 is a block diagram of a channel equalizer of a VSB digital transmission system in accordance with this invention.

As shown in FIG. 3, a channel equalizer includes a composite filter part 10 and a composite filter coefficient restoring part 20.

The composite filter part 10 receives an input signal $I_{in}$ from outside of the channel equalizer and produces an I signal and a Q signal respectively, based on the input signal $I_{in}$. The composite filter part 10 then filters the I signal and the Q signal according to composite filter coefficients $C_R$ and $C_I$ and transmits the filtered signals as first, and second output signals $I_{out}$ and $Q_{out}$.

The composite filter coefficient restoring part 20 calculates errors for training sequence $E_T$ and errors for general data $E_R$ and $E_I$ using a synchronization signal SYNC received from outside of the channel equalizer, the first output signal $I_{out}$, and the second output signal $Q_{out}$ received from the composite filter part 10. The composite filter coefficient restoring part 20 further calculates a real composite filter coefficient $C_R$ and an imaginary composite filter coefficient $C_I$ based on the I signal and the Q signal produced at the composite filter part 10 and the calculated errors for training sequence $E_T$ and the calculated errors for general data $E_R$ and $E_I$. The calculated real composite filter coefficient $C_R$ and an imaginary composite filter coefficient $C_I$ are transmitted to the composite filter part 10.

Figure 4:
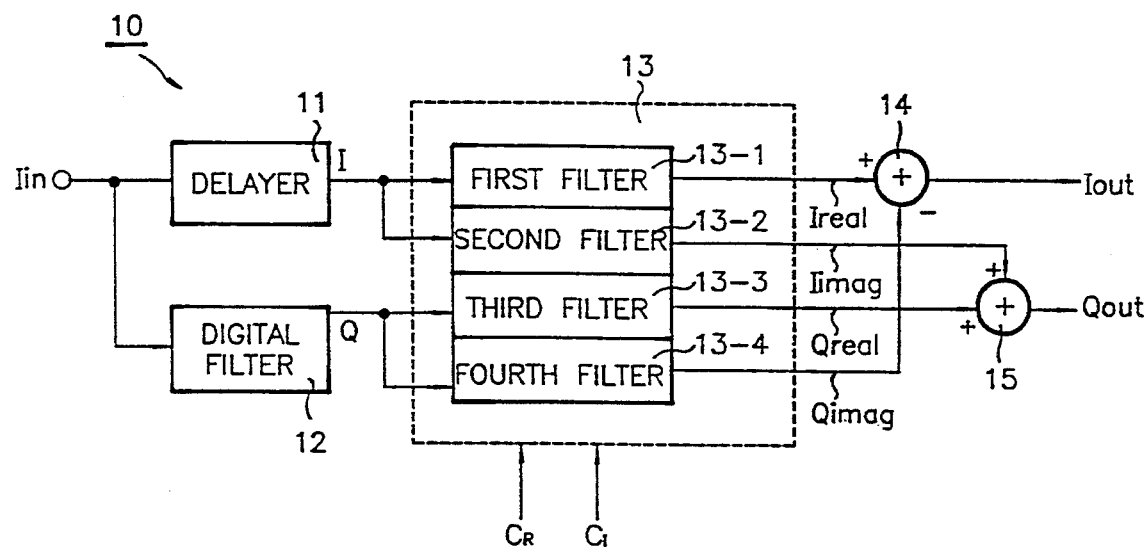
FIG. 4 is a detailed diagram of the composite filter part of FIG. 3.

As shown in FIG. 4, the composite filter part 10 includes a delayer 11 for delaying the received input signal $I_{in}$ and transmitting the delayed signal as an I signal, a digital filter 12 for digital filtration of the received input signal $I_{in}$ and transmitting the filtered signal as a Q signal, a filter group 13 for filtering the I signal and the Q signal received from the delayer 11 and the digital filter 12 using the composite filter coefficients $C_R$ and $C_I$ received from the composite filter coefficient restoring part 20 respectively, and transmitting the filtered signals as a real I signal $I_{real}$, an imaginary I signal $I_{imag}$, a real Q signal $Q_{real}$, and an imaginary Q signal $Q_{imag}$, a subtracter 14 for calculating the difference of the real I signal $I_{real}$ and the imaginary Q signal $Q_{imag}$ received from the filter group 13 and transmitting the calculated difference as a first output signal $I_{out}$, and an adder 15 for adding the imaginary I signal $I_{imag}$ and the real Q signal $Q_{real}$ received from the filter group 13 and transmitting the added signal as a second output signal $Q_{out}$.

The filter group 13 includes a first filter 13-1 for transmitting real I signal $I_{real}$ by filtering the I signal received from the delayer 11 according to the real composite filter coefficient $C_R$ received from the composite filter restoring part 20, a second filter 13-2 for transmitting imaginary I signal $I_{imag}$ by filtering the I signal received from the delayer 11 according to the imaginary composite filter coefficient $C_I$ received from the composite filter restoring part 20, a third filter 13-3 for transmitting real Q signal $Q_{real}$ by filtering the Q signal received from the digital filter 12 according to the real composite filter coefficient $C_R$ received from the composite filter restoring part 20, and a fourth filter 13-4 for transmitting imaginary Q signal $Q_{imag}$ by filtering the Q signal received from the digital filter 12 according to the imaginary composite filter coefficient $C_I$ received from the composite filter restoring part 20.

Figure 5:
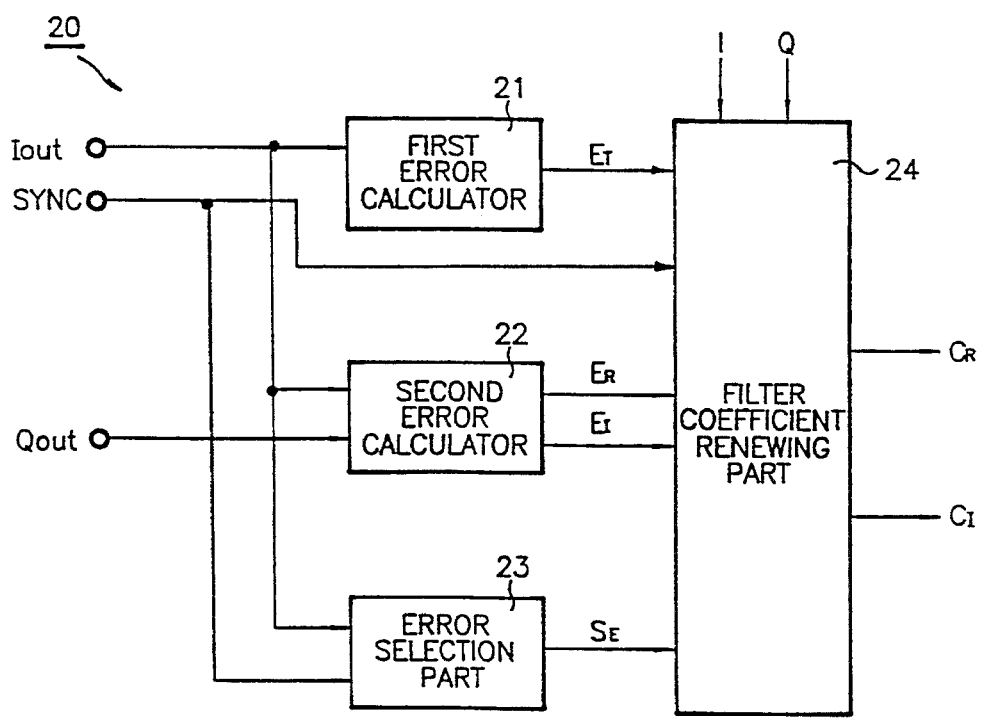
FIG. 5 is a diagram of the composite coefficient restoring part of FIG. 3.

As shown in FIG. 5, the composite filter coefficient restoring part 20 includes a first error calculator 21 for calculating an error of the training sequence $E_T$ using the synchronization signal SYNC applied from outside of the channel equalizer and the first output signal $I_{out}$ received from the composite filter part 10, a second error calculator 22 for calculating errors $E_R$ and $E_I$ using the first and the second output signals $I_{out}$ and $Q_{out}$ received from the composite filter part 10, an error selection part 23 for generating a selection signal $S_E$ for selecting an error of training sequence $E_T$ while in the training sequence period and errors of general data $E_R$ and $E_I$ while not in the training sequence period using the received outside synchronization signal SYNC and the first output signal $I_{out}$ received from the composite filter part 10, and a filter coefficient restoring part 24 for selecting one of the error signals received from the first and the second error calculators 21 and 22 according to the selection signal $S_E$ received from the error selection part 23 and calculating the real composite filter coefficient $C_R$ and the imaginary composite filter coefficient $C_I$ using the selected errors $E_T$, $E_R$, and $E_I$ and the I and Q signals produced by the composite filter part 10.

Figure 6:
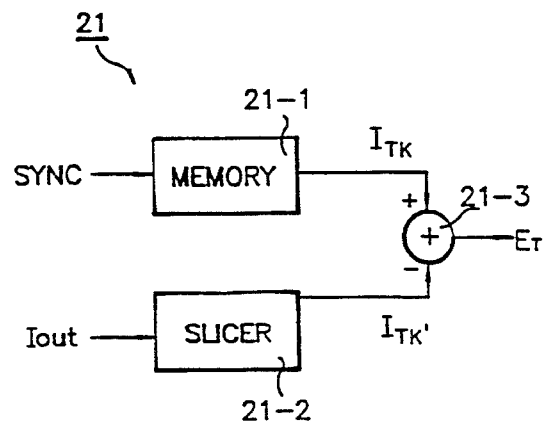
FIG. 6 is a block diagram of the first error calculator of FIG. 5.

As shown in FIG. 6, the first error calculator 21 for calculating the error $E_T$ for the training sequence during the training sequence period includes, a memory 21-1 for storing predetermined training sequence signal $I_{TK}$ and for transmitting a corresponding training sequence signal according to the applied synchronization signal SYNC, a slicer 21-2 for converting the level of the first output signal $I_{out}$ received from the composite filter part 10 to a signal having a transmission level, and a subtracter 21-3 for calculating the difference of the training sequence signal received from the memory 21-1 and the converted signal from the slicer 21-2 and for transmitting the calculated difference as an error of training sequence $E_T$.

Figure 7:
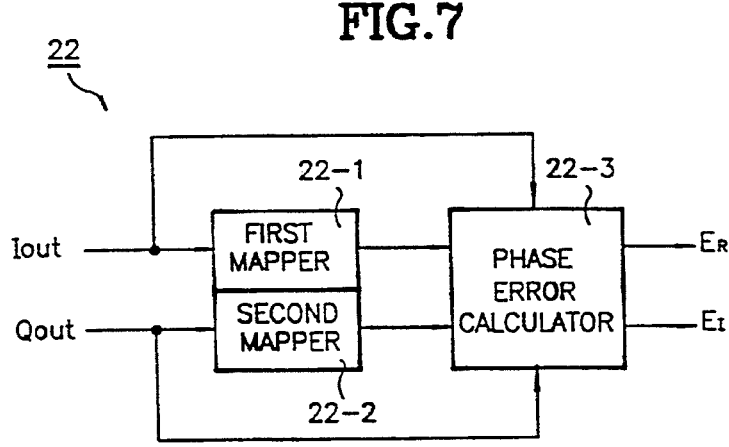
FIG. 7 is a block diagram of the second error calculator of FIG. 5.

As shown in FIG. 7, the second error calculator 22 for calculating, outside of the training sequence period, errors $E_R$ and $E_I$ for general data includes, a first mapper 22-1 for generating an error of the first output signal Iout received from the composite filter part 10, a second mapper 22-2 for generating the error of second output signal $Q_{out}$ received from the composite filter part 10, and a phase error calculator 22-3 for calculating errors of general data $E_R$ and $E_I$ based on the signals received from the first and the second mappers 22-1 and 22-2 and the first and the second output signals $I_{out}$ and $Q_{out}$ received from the composite filter part 10.

Figure 10:
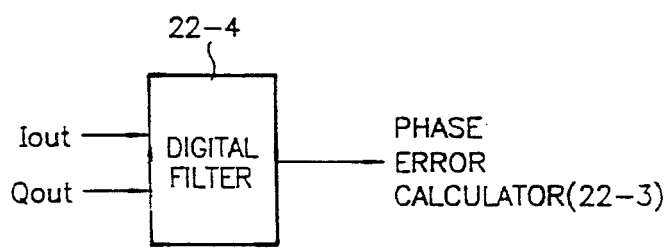
FIG. 10 is a block diagram of one embodiment of the second mapper of the second error calculator of FIG. 7.

In a preferred embodiment, the first mapper and the second mapper 22-1 and 22-2 include PROM. The second mapper 22-2 can be replaced with a digital filter 22-4, as shown in FIG. 10, that inverts the phase of the first output signal $I_{out}$ received from the composite filter part 10 by 90 degrees and compares the inverted signal to the second output signal $Q_{out}$ received from the composite filter part 10.

Figure 11:
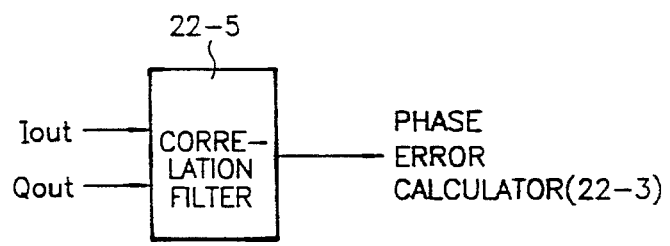
FIG. 11 is a block diagram of another embodiment of the second mapper of the second error calculator of FIG. 7.

In another preferred embodiment, the second mapper 22-2 can be replaced with a correlating filter 22-5 shown in FIG. 11 that receives the first and the second output signals $I_{out}$ and $Q_{out}$ from the composite filter part 10 and obtains the correlation of the signals.

Figure 8:
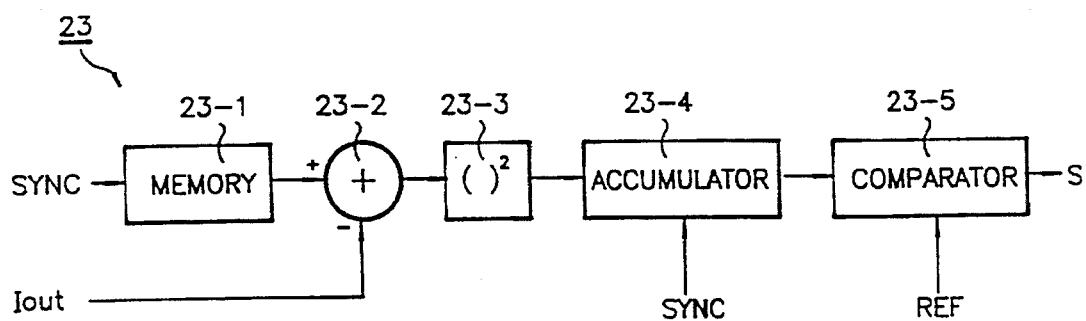
FIG. 8 is a block diagram of the error selection part of FIG. 5.

As shown in FIG. 8, the error selection part 23 includes a memory 23-1 for storing predetermined training sequence signals and for transmitting corresponding training sequence signals according to the outside synchronization signal SYNC, a subtracter 23-2 for calculating the difference of the training sequence signal received from the memory 23-1 and the first output signal $I_{out}$ received from the composite filter part 10, an average value calculator 23-3 for calculating an average value of the signals received from the subtracter 23-2, an accumulator 23-4 for accumulating the average values received from the average value calculator 23-3 according to the outside synchronization signal SYNC, and a comparator 23-5 for generating a selection signal $S_E$ by comparing the accumulated average received from the accumulator 23-4 to a preset reference value REF and selecting the channel equalization using the training sequence if the accumulated average is greater than the reference value REF and selecting the channel equalization using general data if the accumulated average is less than the reference value REF.

Figure 9:
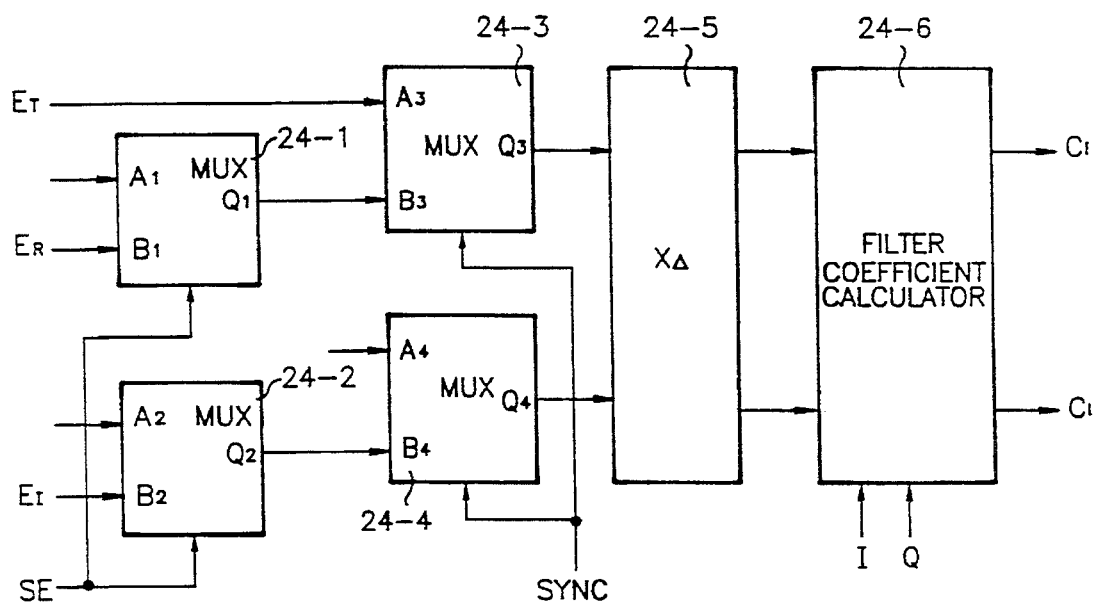
FIG. 9 is a block diagram of the filter coefficient restoring part of FIG. 5.

As shown in FIG. 9, the filter coefficient restoring part 24 includes a first multiplexer 24-1 for receiving the real error $E_R$ and '0' of the errors of general data $E_R$ and $E_I$ applied from the second error calculator 22, and for selecting and transmitting '0' while in the training sequence period and selecting real error $E_R$ while not in the training sequence period according to the selection signal $S_E$ received from the error selection part 23, a second multiplexer 24-2 for receiving imaginary error $E_I$ and '0' of the errors of general data $E_R$ and $E_I$ applied from the second error calculator 22, and for selecting and transmitting '0' while in the training sequence period and selecting imaginary error $E_I$ while not in the training sequence period according to the selection signal $S_E$ received from the error selection part 23, a third multiplexer 24-3 for receiving error of training sequence $E_T$ applied from the first error calculator 21 and the selected signal applied from the first multiplexer 24-1, selecting and transmitting the error of training sequence $E_T$ while in the training sequence period and selecting the signal applied from the first multiplexer 24-1 while not in the training sequence period according to the received synchronization signal SYNC, a fourth multiplexer 24-4 for receiving the signal applied from the second multiplexer 24-2 and a '0' signal, and for selecting and transmitting '0' while in the training sequence period and selecting the signal applied from the second multiplexer 24-2 while not in the training sequence period according to the received synchronization signal SYNC, a multiplier 24-5 for multiplying a certain constant $\Delta$ to the signals received from the third and fourth multiplexers 24-3 and 24-4, and a filter coefficient calculator 24-6 for calculating composite filter coefficients $C_R$ and $C_I$ using the I signal and the Q signal received from the composite filter part 10 and the signal received from the multiplier 24-5.

In order to prevent the error value from converging, the constant $\Delta$ is set greater than '0', but less than '1'. In a preferred embodiment the constant $\Delta$ is set greater than $2^{-12}$, but less than $2^{-9}$.

Operation of the channel equalizer in accordance with this invention is to be explained hereinafter.

The channel equalizer utilizes the I signal and the Q signal, by not only taking the I signal as the input signal $I_{in}$, and producing the I signal and the Q signal utilizing this input signal $I_{in}$, but also by using the general data if no training sequence is present.

If there is no phase error in the input signal $I_{in}$, the Q signal has no correlation with the input signal $I_{in}$, but if there is phase error, the input signal $I_{in}$ has correlation with the Q signal in proportion to the phase error.

The input signal $I_{in}$ is filtered upon being applied to the composite filter part 10, which is to be explained hereinafter in detail, referring to FIG. 4.

The input signal $I_{in}$ is filtered through the digital filter 12 as a Q signal inverted by a phase of 90 degrees, and the input signal $I_{in}$ is delayed through the delayer 11, compensating for the delay of the digital filter 12, and is output from the delayer 11 as an I signal.

The I signal output by the delayer 11 is applied to the first and the second filters 13-1 and 13-2 of the filter group 13, filtered therein according to the composite filter coefficients $C_R$ and $C_I$ received from the composite filter coefficient restoring part 20, and transmitting the filtered signals from the filters 13-1 and 13-2 as a real I signal $I_{real}$ and an imaginary I signal $I_{imag}$, respectively. The Q signal output by the digital filter 12 is applied to the third and the fourth filters 13-3 and 13-4 of the filter group 13, filtered therein according to the composite filter coefficients $C_R$ and $C_I$ received from the composite filter coefficient restoring part 20, and transmitting the filtered signals from the filters 13-3 and 13-4 as a real Q signal $Q_{real}$ and an imaginary Q signal $Q_{imag}$, respectively.

In this instant, the first and the third filters 13-1 and 13-2 receive the composite filter coefficient $C_R$, and the second and the fourth filters 13-2 and 13-4 receive the composite filter coefficient $C_I$.

The transmitted signals $I_{real}$ and $Q_{imag}$ are subtracted by the subtracter 14 and the result is output as Iout. The transmitted signals $I_{imag}$ and $Q_{real}$ are added by the adder 15 and the result ms output as $Q_{out}$. The subtracter 14 generates the first output signal $I_{out}$ by having the Q signal component removed from the I signal by subtracting the imaginary Q signal $Q_{imag}$ from the real I signal $I_{real}$. The adder 15 generates the second output signal $Q_{out}$ by adding the real Q signal $Q_{real}$ to the imaginary I signal $I_{imag}$. The channel equalizer, in accordance with this invention, carries out channel equalization according to the first and the second output signal $I_{out}$ and $Q_{out}$.

A method for obtaining the composite filter coefficients required for channel equalization is to be explained hereinafter, referring to FIGS. 5, 6, 7, 8, and 9.

The composite filter coefficient restoring part 20 carries out the calculation of composite filter coefficients $C_R$ and $C_I$ using the I signal and the Q signal received from the delayer 11 and the digital filter 12 respectively, and the first and the second output signals $I_{out}$ and $Q_{out}$ received from the adder 15 and the subtracter 14 respectively.

The method for obtaining the composite filter coefficients includes a first step of calculating error $E_T$ of the training sequence and errors $E_R$ and $E_I$ of the general data through the first error calculator 21 and the second error calculator 22 respectively, a second step for obtaining the selection signal $S_E$ that is used in selecting the error of the training sequence while in the training sequence period and selecting the errors of the general data while not in the training sequence period from the error selection part 23, and a third step for obtaining the composite filter coefficients $C_R$ and $C_I$ from the filter coefficient restoring part 24.

A method for obtaining error $E_T$ of the training sequence is to be explained hereinafter, referring to FIG. 6. When the memory 21-1 receives the synchronization signal SYNC applied from outside of the channel equalizer, the memory 21-1 transmits the stored training sequence signal $I_{TK}$ of the transmitter according to the received synchronization signal SYNC. The first output signal $I_{out}$, transmitted from the composite filter part 10, is received at the slicer 21-2, converted into a signal having a predetermined transmission level, and transmitted as a converted first output signal $I_{TK}'$.

The training sequence signal $I_{TK}$, and the converted first output signal $I_{TK}'$ applied from the memory 21-1 and the slicer 21-2 respectively, are subtracted by the subtracter 21-3, and the difference of the two signals $I_{TK}-I_{TK}'$ is transmitted as an error of the training sequence.

A method for obtaining errors $E_R$ and $E_I$ of the general data is to be explained hereinafter, referring to FIGS. 7 and 12. Outside of the training sequence period, the difference between the transmission levels of the first and the second output signals $I_{out}$ and $Q_{out}$ output by the composite filter part 10, with a reference value REF, is obtained.

Figure 12:
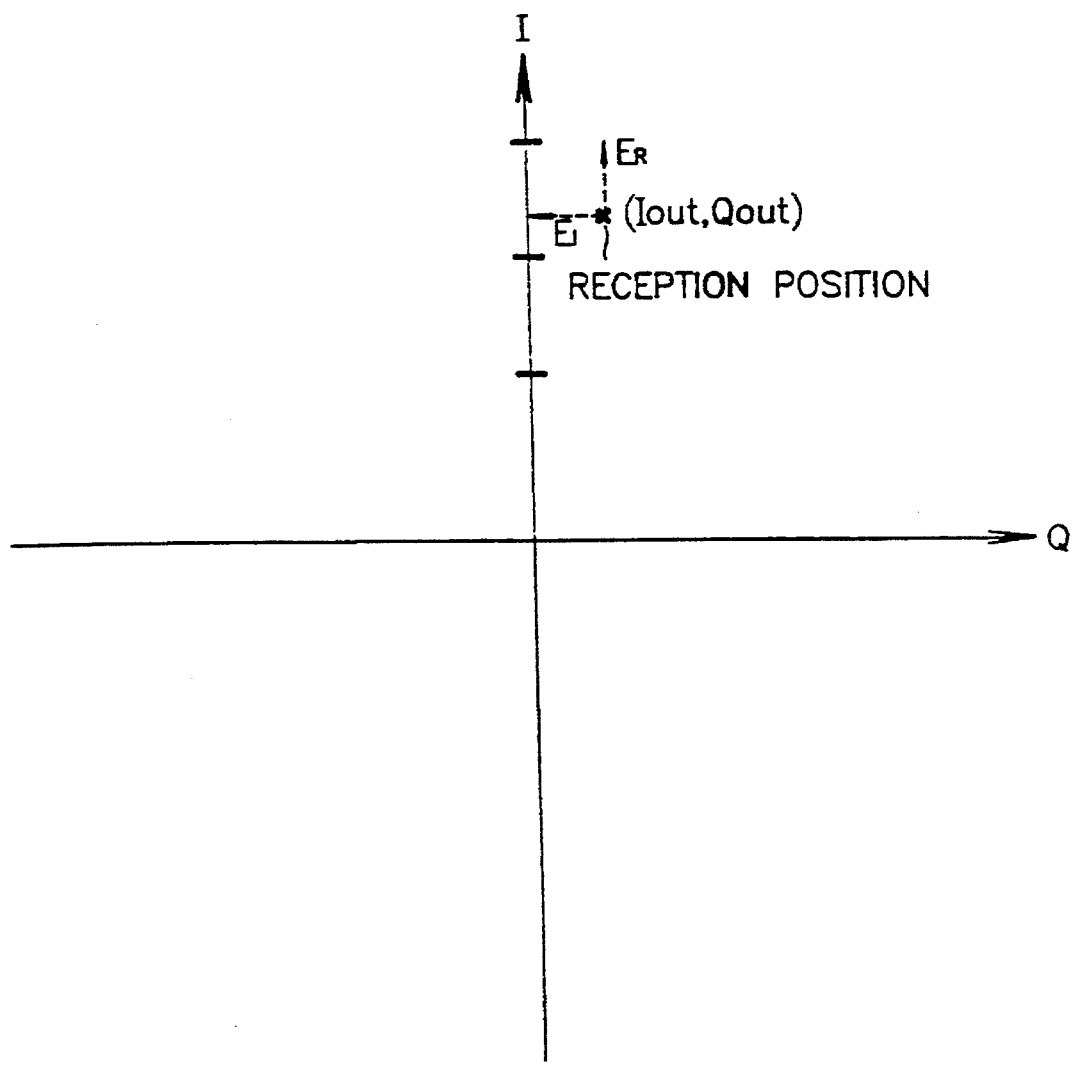
FIG. 12 is a diagram showing the method for calculating error in accordance with this invention.

For example, as shown in FIG. 12, the error $E_R$ is the difference of the reference level and the present reception position of the first output signal $I_{out}$. The error $E_I$ is the difference of the reference level and the present reception position of the second output signal $Q_{out}$.

The first mapper 22-1 is used for obtaining the error of the first output signal $I_{out}$ received from the composite filter part 10, for storing the difference (error value) of the transmission level of the received first output signal $I_{out}$, and for transmitting the corresponding error value of the stored error values upon receiving the first output signal $I_{out}$ from the composite filter part 10.

The second mapper 22-2 is used for obtaining the error of the second output signal $Q_{out}$ received from the composite filter part 10. If the received second output signal $Q_{out}$ is erratic, the second mapper 22-2 transmits the error of the second output signal $Q_{out}$ as "0".

FIG. 10 shows one of the preferred embodiments, in which the second mapper 22-2 has been replaced with a digital filter 22-4. The digital filter 22-4 calculates the difference between the received signal $I_{out}$ inverted in phase by 90 degrees through Hilbert transformation, and the second output signal $Q_{out}$ transmitted from the composite filter part 10. The calculated difference is transmitted to the error calculator 22-3.

FIG. 11 shows another preferred embodiment, in which the second mapper 22-2 has been replaced with a correlation filter 22-5. The correlation of the first and second output signals $I_{out}$ and $Q_{out}$ transmitted from the composite filter part 10 is determined by the correlation filter 22-5 and transmitted to the phase calculator 22-3. The operations of the correlation filter 22-5 determine if the first and second output signals $I_{out}$ and $Q_{out}$ transmitted from the composite filter part 10 have correlation, and if there is correlation it means that there is a phase error, if there is no correlation, it means that there is no phase error.

Accordingly, the phase error calculator 22-3 receives and multiples the error value obtained at the first mapper 22-1 and the first output signal Iout applied from the composite filter part 10, and transmits the result of the multiplication as the error $E_R$ for the general data. The phase error calculator 22-3 receives and multiples the error value obtained at the second mapper 22-2 and the second output signal $Q_{out}$ applied from the composite filter part 10, and transmits the result of the multiplication as the error $E_I$ for the general data.

The filter coefficient restoring part 24 calculates the composite filter coefficients $C_R$ and $C_I$ through selecting the output signal $E_T$ of the first error calculator 21 and the output signals $E_R$ and $E_I$ of the second error calculator 22 according to the selection signal $S_E$ received from the error selection part 23, which will be explained later.

The operation for generating the selection signal $S_E$ at the error selection part 23 is to be explained hereinafter, referring to FIG. 8.

When an outside synchronization signal SYNC is received, the memory 23-1 transmits the stored training sequence signal to the subtractor 23-2. The subtractor 23-2 determines the error of the training sequence signal by calculating the difference between the training sequence signal and the first output signal $I_{out}$ applied from the composite filter part 10. The error is applied to the average value calculator 23-3, for calculation of the average value.

The average values obtained at the average value calculator 23-3 are accumulated in the accumulator 23-4 according to the received synchronization signal SYNC.

The accumulated average value received from the accumulator 23-4 is compared to a preset reference value REF at the comparator 23-5, and the comparator 23-5 generates a corresponding selection signal $S_E$. If the error value for the training sequence is greater than the reference value REF, then the error value for the general data is greater, and a channel equalization based on the training sequence is carried out. If the error value for the training sequence is less than the reference value REF, then the error value for the general data is less than, and a channel equalization based on the general data is carried out.

Finally, the operation of selecting the errors ET, $E_R$ and $E_I$ according to the selection signal, and obtaining the composite error coefficients $C_R$ and $C_I$ based on the selected error, is explained hereinafter, referring to FIG. 9.

When the selection signal $S_E$ for selecting a channel equalization according to the training sequence is output by the error selection part 23 to the filter coefficient restoring part 24, the multiplexers 24-1 and 24-2 select '0' and '0' of the signals $(O,E_R)$ and $(0,E_I)$ applied to the two input terminals (A1,B1) and (A2,B2) respectively.

Therefore, the multiplexers 24-3 and 24-4 have the '0' applied to all the one input terminals (B3,B4) and the output of the first error calculation part 21, $E_T$ and '0', applied to the other input terminals (A3,A4) respectively.

During the training sequence period, by selecting the signals $E_T$ and '0' received at the other input terminals (A3,A4) of the multiplexers 24-3 and 24-4 according to the received synchronization signal SYNC and applying the selected signals to the multiplier 24-5 respectively, the signals $E_T$ and '0' are multiplied by the certain constant 'Δ'.

The signals received by the filter coefficient calculator 24-6 from multiplier 24-5 are multiplied by the I signal and Q signal received from the composite filter part 10.

The filter coefficient calculator 24-6 outputs $\Delta E_T \times I$ and '0' as the filter coefficients $C_R$ and $C_I$ to the filter group 13 of the composite filter part 10.

When the selection signal $S_E$ for selecting a channel equalization based on general data is applied to the filter coefficient restoring part 24, the multiplexers 24-1 and 24-2 select $E_R$ and $E_I$ from the signals O, $E_R$ and $0, E_I$ received at input terminals A1, B1 and A2, B2, respectively.

Therefore, when the of channel equalization is based on general data, the multiplexers 24-3 and 24-4 receive $E_R$ and $E_I$ at input terminals B3 and B4 respectively, and receive the output $E_T$ and '0' of the first error calculator 21 at the other input terminals A3 and A4, respectively. The signals $E_R$ and $E_I$ are selected according to the received synchronization signal SYNC and the selected signals are output to the multiplier 24-5 and signals $E_R$ and $E_I$ are multiplied to the certain constant Δ.

The signal output by the multiplier 24-5 is applied to the filter coefficient calculator 24-6, and multiplied to the I signal and the Q signal applied from the composite filter part 10. The filter coefficient calculator 24-6 produces $E_R \times I$, and $\Delta E_T \times Q$ as the filter coefficients $C_R$ and $C_I$ which is applied to the filter group 13 of the composite filter part 10.

The channel equalizer of this invention does not apply the output signals of the multiplexers 24-1 through 24-4 directly to the filter coefficient calculator 24-6 but rather apply the output signals after being reduced by the certain constant 'Δ' through the multiplier 24-5.

The process for correcting phase error is to be explained hereinafter, using the following formulas.

$$(I \cos \theta, Q \sin \theta) \qquad \text{equation 2}$$

$$\cos \theta \sin \theta - \sin \theta \cos \theta \qquad \text{equation 3}$$

The output value of the filter group 13 is as shown in the following equation 4.

$$(I \cos \theta, Q \sin \theta) \cos \theta \sin \theta - \sin \theta \cos \theta = (I \cos^2 \theta, Q \sin^2 \theta)/I_{out} + (I+Q) \sin \theta \cos \theta/Q_{out} \qquad \text{equation 4.}$$

It can be seen from equation 4 that, $I_{out}$ being $I\cos^2\theta - Q\sin^2\theta$, the Q signal which is a phase error has been eliminated from the I signal.

As has been explained, this invention can improve the converging speed of a VSB transmission system by correcting phase errors using composite filters as well as by carrying out channel equalization using general data even in a period having no training sequence.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A channel equalizer for a HDTV comprising:

a composite filter part for receiving an input signal from outside of the channel equalizer and producing an I signal and a Q signal based on the received input signal, filtering the I signal and the Q signal according to real and imaginary composite filter coefficients, and transmitting the filtered I and Q signals as first, and second output signals respectively; and, a composite filter restoring part for calculating an error for a training sequence and errors for general data using a synchronization signal received from the outside of the channel equalizer, the first output signal and the second output signal received from the composite filter part, and for calculating the real composite filter coefficients and the imaginary composite filter coefficients based on errors for the I signal and the Q signal produced at the composite filter part and the error of the training sequence and the errors for the general data and transmitting the calculated real and imaginary composite filter coefficients to the composite filter part.

2. The channel equalizer for a HDTV as claimed in claim 1, wherein the composite filter part includes:

a delayer for delaying the received input signal and transmitting the delayed signal as the I signal;

a digital filter for digital filtration of the received input signal and transmitting the filtered signal as the Q signal;

a filter group for filtering the I signal and the Q signal received from the delayer and the digital filter using the real and imaginary composite filter coefficients received from the composite filter restoring part and transmitting the filtered signals as a real I signal, an imaginary I signal, a real Q signal, and an imaginary Q signal;

a subtracter for calculating a difference of the real I signal and the imaginary Q signal received from the filter group and transmitting the calculated difference as the first output signal; and an adder for adding the imaginary I signal and the real Q signal received from the filter group and transmitting the added signal as the second output signal.

3. The channel equalizer for a HDTV as claimed in claim 2, wherein the filter group includes:

a first filter for producing the real I signal by filtering the I signal received from the delayer according to the real composite filter coefficient received from the composite filter restoring part;

a second filter for producing the imaginary I signal by filtering the I signal received from the delayer according to the imaginary composite filter coefficient received from the composite filter restoring part;

a third filter for producing the real Q signal by filtering the Q signal received from the digital filter according to the real composite filter coefficient received from the composite filter restoring part; and a fourth filter for producing the imaginary Q signal by filtering the Q signal received from the digital filter according to the imaginary composite filter coefficient received from the composite filter restoring part.

4. The channel equalizer for a HDTV as claimed in claim 1, wherein the composite filter restoring part includes:

a first error calculator for calculating the error of the training sequence using the received synchronization signal and the first output signal received from the composite filter part;

a second error calculator for calculating the errors for the general data using the first and the second output signals received from the composite filter part;

an error selection part for generating a selection signal for selecting the error of the training sequence during a training sequence period and the errors of the general data outside of the training sequence period using the received synchronization signal and the first output signal received from the composite filter part; and a filter coefficient restoring part for selecting between the error of the training sequence and the errors of the general data, received from the first and the second error calculators, according to the selection signal received from the error selection part and calculating the real composite filter coefficients and the imaginary composite filter coefficients using the selected errors, and using the I and Q signals produced at the composite filter part.

5. The channel equalizer for a HDTV as claimed in claim 4, wherein the first error calculator includes:

a memory for storing a predetermined training sequence signal and transmitting a corresponding training sequence signal according to the received synchronization signal;

a slicer for converting a level of the first output signal received from the composite filter part to a transmission level; and a subtracter for calculating the difference between the transmitted training sequence signal and the converted first output signal and transmitting the calculated difference as the error of the training sequence.

6. The channel equalizer for a HDTV as claimed in claim 4, wherein the second error calculator includes:

a first mapper for generating the error of the first output signal received from the composite filter part;

a second mapper for generating the error of the second output signal received from the composite filter part; and a phase error calculator for calculating the errors of the general data based on the signals received from the first and the second mappers and the first and the second output signals received from the composite filter part.

7. The channel equalizer for a HDTV as claimed in claim 6, wherein the first mapper has PROMs.

8. The channel equalizer for a HDTV as claimed in claim 6, wherein the second mapper generates the error of the second output signal as '0' if the second output signal received from the composite filter part is erratic.

9. The channel equalizer for a HDTV as claimed in claim 6, wherein the second mapper has PROMs.

10. The channel equalizer for a HDTV as claimed in claim 6, wherein the second mapper has a digital filter.

11. The channel equalizer for a HDTV as claimed in claim 6, wherein the second mapper has a correlation filter.

12. The channel equalizer for a HDTV as claimed in claim 4, wherein the error selection part includes:

a memory for storing predetermined training sequence signals in advance and transmitting a corresponding training sequence signal according to the received synchronization signal, a subtracter for calculating the difference between the training sequence signal received from the memory and the first output signal received from the composite filter part;

an average value calculator for calculating an average value of the signals received from the subtracter;

an accumulator for accumulating average values received from the average value calculator according to the received synchronization signal and for outputting an accumulated average value; and a comparator for generating the selection signal by comparing the accumulated average value received from the accumulator to a preset reference value and selecting channel equalization using the training sequence if the accumulated average is greater than the reference value and selecting the channel equalization using the general data if the accumulated average is less than the reference value.

13. The channel equalizer for a HDTV as claimed in claim 4, wherein the filter coefficient restoring part includes:

a first multiplexer for receiving real error and '0' of the errors of the general data applied from the second error calculator, selecting '0' during the training sequence period and selecting the real error outside of the training sequence period according to the selection signal received from the error selection part, and transmitting a first selected signal;

a second multiplexer for receiving imaginary error and '0' of the errors of the general data applied from the second error calculator, selecting '0' during the training sequence period and selecting the imaginary error outside of the training sequence period according to the selection signal received from the error selection part, and transmitting a second selected signal;

a third multiplexer for receiving the error of the training sequence applied from the first error calculator and the first selected signal applied from the first multiplexer, selecting the error of the training sequence during the training sequence period and selecting the signal applied from the first multiplexer outside of the training sequence period, according to the received synchronization signal, and transmitting a third selected signal;

a fourth multiplexer for receiving the signal applied from the second multiplexer and '0', selecting '0' during the training sequence period and selecting the second selected signal applied from the second multiplexer outside of the training sequence period, according to the received synchronization signal, and transmitting a fourth selected signal;

a multiplier for multiplying a certain constant $\Delta$ by the third and fourth selected signals received from the third and fourth multiplexers; and a filter coefficient calculator for calculating the real and imaginary composite filter coefficients using the I signal and the Q signal received from the composite filter part and a product signal received from the multiplier.

14. The channel equalizer for HDTV as claimed in claim 13, wherein the certain constant is set greater than zero, but less than one.

15. The channel equalizer for a HDTV as claimed in claim 14, wherein the certain constant is set greater than $2^{-12}$, but less than $2^{-9}$.

* * * * *